(No Model.)
J. C. HENRY.
TRUCK FOR ELECTRIC LOCOMOTIVES.
No. 493,089. Patented Mar. 7, 1893.
Fig. I.
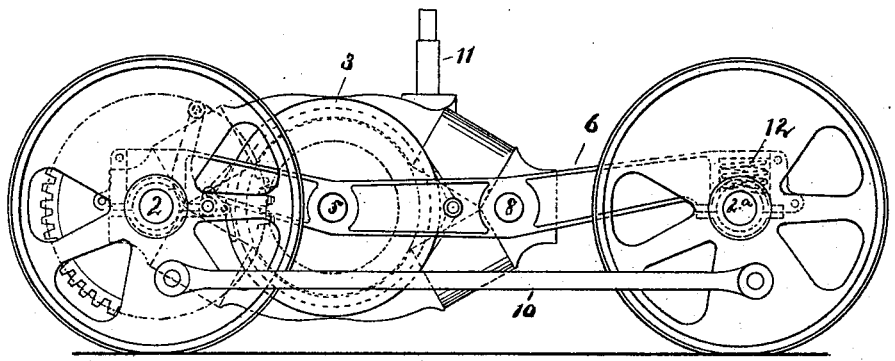
Fig. II.
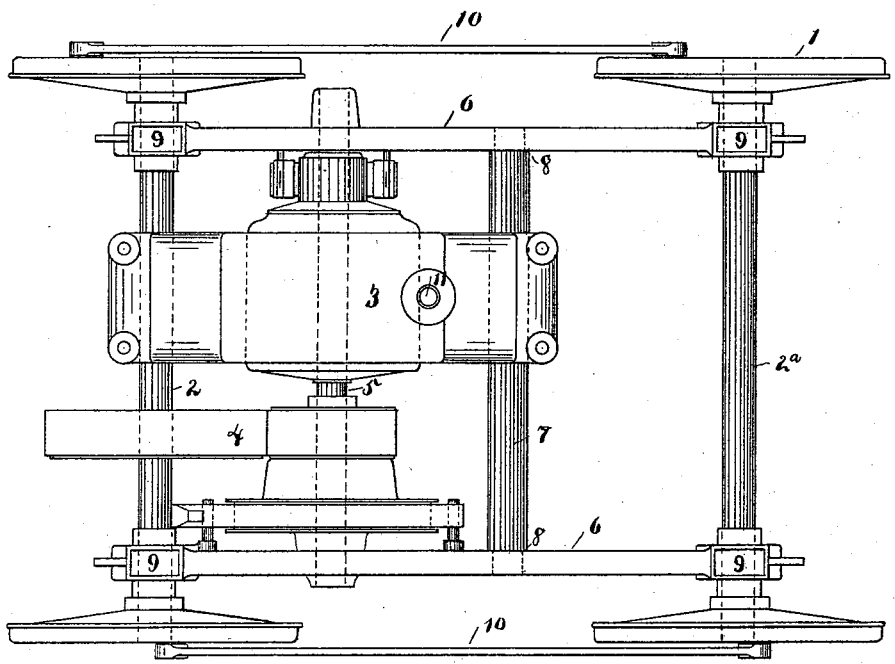
Witnesses
Geo. H. Knight Jr.
M. E. Bridgood
Inventor
John C. Henry
By Knight Bro.
Attys

UNITED STATES PATENT OFFICE.

JOHN C. HENRY, OF NEW YORK, N. Y.

TRUCK FOR ELECTRIC LOCOMOTIVES.

SPECIFICATION forming part of Letters Patent No. 493,089, dated March 7, 1893.

Application filed December 18, 1891. Serial No. 415,498. (No model.)

*To all whom it may concern:*

Be it known that I, JOHN C. HENRY, a citizen of the United States, residing in New York city, county and State of New York, have invented certain new and useful Improvements in Electric-Motor Trucks, of which the following is a specification.

This invention relates especially to that form of trucks for electric railway cars wherein the motor is adapted to form a part of the truck-frame and support the weight of the car-body.

In the accompanying drawings, Figure I is a side elevation of my improved motor truck. Fig. II is a plan view of the same.

The truck-wheels are shown at 1, 1; the axles at 2, $2^a$, and the motor at 3 having connection by speed reducing gear 4 with the axle 2. The armature-shaft 5 of the motor is journaled in the side-bars 6, 6, which with the cross-bar 7 and the motor field magnets form the truck frame. Said field magnets are supported on the bar 7 and the axle 2, the latter being journaled therein, if necessary. The bar 7 is shouldered, as shown at 8, 8, to maintain the side-bars 6, 6 at the proper distance asunder. The side-bars have journals 9, 9 for the axles 2, $2^a$, and are held pressed up to the hubs of the car-wheels by the shouldered-bar 7. The car-wheels are preferably connected on both sides by rods 10, 10. On the top of the motor field magnets at the center point of the truck I arrange a king-pin, 11, to receive the weight of the car-body. The ends of the bars 6, 6 resting on axle $2^a$ are supported therefrom by springs indicated at 12, Fig. I. While, therefore, the connection of the armature with the other axle is unyielding and positive, the connection at this axle, $2^a$, is such as to give the necessary play to the car-body and motor.

I claim as my invention—

1. The combination with the car wheels and axles of the truck-frame, the motor supported thereon and the shouldered cross-bar forming part of said frame and spreading the side-bars thereof against the wheel hubs.

2. The combination, in an electric motor truck, of the wheels and axles, and a motor having spring support between its frame and one of the car axles, and bearing on its field magnet a king-pin for the car-body, the car body being supported directly on the field magnet intermediate of its ends whereby the field magnet itself forms a supporting arch or beam for the car body.

3. The combination with the wheels and axles, of the side-bars 6 journaled on axle 2, and spring-supported from axle $2^a$, the cross-bar 7 and the motor whose armature is journaled in said side-bars, and mechanically coupled to the axle 2 and whose field-magnets are supported on the axle 2 and said crossbar and bearing a king-pin adapted to form a pivot for the car-body.

4. The combination with the wheels and axles of an electric motor truck, of a frame spring-supported on one axle, and having non-yielding bearing on the other axle and a motor hung at one end on said frame and at the other end hung directly on the axle of the truck on which said frame has non-yielding bearing, substantially as set forth.

JOHN C. HENRY.

Witnesses:
 LILLIE HANNA,
 M. V. BIDGOOD.